(12) United States Patent
Han et al.

(10) Patent No.: US 9,163,805 B2
(45) Date of Patent: Oct. 20, 2015

(54) LED LENS AND LED MODULE FOR TWO-SIDED LIGHTING, AND LED TWO-SIDED LIGHTING APPARATUS USING SAME

(75) Inventors: Joo Hun Han, Hwaseong-si (KR); Je Myung Park, Suwon-si (KR); Hyun Do Park, Seongnam-si (KR); Yong Keun Jee, Suwon-si (KR); Do Hyeon Lee, Anyang-si (KR); Ki Un Lee, Suwon-si (KR); Jin Tae Kim, Seongnam-si (KR); Choul Ho Lee, Suwon-si (KR); Tetsuo Ariyoshi, Osaka (JP); Choong Gunn Park, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/234,910

(22) PCT Filed: Jul. 26, 2011

(86) PCT No.: PCT/KR2011/005511
§ 371 (c)(1),
(2), (4) Date: Apr. 11, 2014

(87) PCT Pub. No.: WO2013/015468
PCT Pub. Date: Jan. 31, 2013

(65) Prior Publication Data
US 2014/0218919 A1    Aug. 7, 2014

(51) Int. Cl.
*F21V 5/04* (2006.01)
*F21V 13/04* (2006.01)
(Continued)

(52) U.S. Cl.
CPC . *F21V 13/04* (2013.01); *F21V 3/04* (2013.01); *F21V 5/04* (2013.01); *F21V 7/0091* (2013.01);
(Continued)

(58) Field of Classification Search
CPC ......... F21V 5/04; F21V 7/0091; F21V 29/70; F21V 13/04; F21V 3/0418; G02B 19/0028; G02B 19/0066; G02B 19/0061; G02B 5/0242; F21K 9/50; F21Y 2103/003
See application file for complete search history.

(56) References Cited

U.S. PATENT DOCUMENTS 7,740,366 B2 *   6/2010   Tetsuo et al. .................. 362/97.3
8,585,254 B2 * 11/2013   Arai et al. ...................... 362/317
(Continued)

FOREIGN PATENT DOCUMENTS

KR    10-2005-0121276 A    12/2005
KR    10-2006-0033572 A    4/2006
(Continued)

OTHER PUBLICATIONS

International Search Report, w/ English translation thereof, issued in Korean Patent Application No. PCT/KR2011/005511 dated Apr. 4, 2012.

*Primary Examiner* — Y M Lee
(74) *Attorney, Agent, or Firm* — McDermott Will & Emery LLP

(57) ABSTRACT

There is provided a light emitting diode (LED) lens for double-sided lighting, including a light diffusion agent diffused therein, the LED lens including a light receiving portion receiving light, a first light transmitting portion corresponding to the light receiving portion and transmitting a portion of the light in an upward direction therefrom, a reflective portion extended from the first light transmitting portion and reflecting a portion of the light, and a second light transmitting portion facing the first light transmitting portion and transmitting the light reflected by the reflective portion in a downward direction therefrom.

6 Claims, 7 Drawing Sheets

(51) Int. Cl.
  *F21V 7/00*      (2006.01)
  *G02B 19/00*     (2006.01)
  *G02B 5/02*      (2006.01)
  *F21V 3/04*      (2006.01)
  *F21V 29/70*     (2015.01)
  *F21Y 101/02*    (2006.01)
  *F21K 99/00*     (2010.01)
  *F21Y 103/00*    (2006.01)
  *F21Y 113/00*    (2006.01)

(52) U.S. Cl.
  CPC .............. *F21V 29/70* (2015.01); *G02B 5/0242* (2013.01); *G02B 19/0028* (2013.01); *G02B 19/0061* (2013.01); *G02B 19/0066* (2013.01); *F21K 9/00* (2013.01); *F21K 9/50* (2013.01); *F21Y 2101/02* (2013.01); *F21Y 2103/003* (2013.01); *F21Y 2113/00* (2013.01)

(56)  References Cited

U.S. PATENT DOCUMENTS

| | | |
|---|---|---|
| 2005/0212089 A1 | 9/2005 | Kiyomoto et al. |
| 2006/0083003 A1 | 4/2006 | Kim et al. |
| 2010/0177262 A1 | 7/2010 | Kimura et al. |
| 2012/0155072 A1* | 6/2012 | Chang .......................... 362/218 |

FOREIGN PATENT DOCUMENTS

| | | |
|---|---|---|
| KR | 10-2006-0130313 A | 12/2006 |
| KR | 10-0790046 B1 | 1/2008 |

* cited by examiner

LED LENS AND LED MODULE FOR TWO-SIDED LIGHTING, AND LED TWO-SIDED LIGHTING APPARATUS USING SAME

RELATED APPLICATIONS

This application is the U.S. National Phase under 35 U.S.C. §371 of International Application No. PCT/KR2011/005511, filed on Jul. 26, 2011, the disclosure of which Application is incorporated by reference herein.

TECHNICAL FIELD

The present disclosure relates to an LED lens and an LED module for double-sided lighting, and a double-sided LED lighting apparatus using the same, and more particularly, to an LED lens and an LED module for double-sided lighting, in which an LED is able to emit light in two directions therefrom, and an LED double-sided lighting apparatus using the same.

BACKGROUND ART

Light emitting diodes (LEDs) are semiconductor light emitting devices emitting light when a current flows therethrough, and converting electrical energy into light energy through PN junction diodes configured of gallium arsenide (GaAs) or gallium nitride (GaN) light semiconductors. Regions of light emitted from the LEDs include blue, green and white in a range of red (630 nm to 700 nm) to blue-violet (400 nm). Such LEDs have positive attributes such as relatively low power consumption, high efficiency and long lifespans, as compared to light sources according to the related art, such as incandescent lamps, fluorescent lamps, or the like. Thus, demand for LEDs has continuously increased.

In recent years, LEDs have come into widespread use, and the range of uses thereof has been increasingly expanded to encompass miniaturized lighting devices for mobile terminals, vehicle lighting devices, indoor lighting devices, lighting devices for outdoor signs, and the like. In particular, the application of LEDs has been increasingly expanded to include lighting devices for signs.

FIG. 1 is a cross-sectional view of a double-sided illuminated sign using a general LED.

In the case of a general LED 11, unlike a fluorescent lamp, light from individual LEDs is only irradiated onto a single light emission surface, and is not irradiated to a surface thereof opposite thereto. Thus, it is necessary to dispose the LED 11 and a diffusion plate 13 on both sides of a circuit board 12, as shown in FIG. 1. Thus, a problem in which the configuration of a double-sided illuminated sign using an LED is relatively complicated and an amount of LEDs is increased may occur.

DISCLOSURE

Technical Problem

An aspect of the present disclosure may provide an LED lens and an LED module for double-sided lighting, in which LEDs are able to emit light in two directions therefrom, and an LED double-sided lighting apparatus using the same.

Technical Solution

According to an aspect of the present disclosure, an LED lens for double-sided lighting, including a light diffusion agent diffused therein, may include: a light receiving portion receiving light; a first light transmitting portion corresponding to the light receiving portion and transmitting a portion of the light in an upward direction therefrom; a reflective portion extended from the first light transmitting portion and reflecting a portion of the light; and a second light transmitting portion facing the first light transmitting portion and transmitting the light reflected by the reflective portion in a downward direction therefrom.

The light receiving portion may be formed to include an apical surface formed in a concave manner in a direction in which the light is incident, and inclined surfaces extended from both sides of the apical surface to be concavely curved.

In this case, the light receiving portion may further include a step portion extended from the inclined surface.

The light diffusion agent may include at least one selected from a group consisting of $TiO_2$, $Al_2O_3$ and $SiO_2$.

The light diffusion agent may be formed of a high-molecular polymer.

The LED lens may be formed of optical glass or optical plastic.

At least one of the first light transmitting portion and the second light transmitting portion may have an uneven structure formed thereon.

According to an aspect of the present disclosure, an LED module for double-sided lighting may include: a circuit board having an LED mounted thereon; and an LED lens mounted on the circuit board and including a light receiving portion receiving light from the LED, a first light transmitting portion corresponding to the light receiving portion and transmitting a portion of the light in an upward direction therefrom, a reflective portion extended from the first light transmitting portion and reflecting a portion of the light, and a second light transmitting portion facing the first light transmitting portion and transmitting the light reflected by the reflective portion in a downward direction therefrom, the LED lens including a light diffusion agent dispersed therein.

The light receiving portion of the LED lens may be formed to include an apical surface formed in a concave manner in a direction in which the light is output, and inclined surfaces extended from both sides of the apical surface to be concavely curved, and the circuit board may be accommodated in a step portion extended from the inclined surface.

The LED module for double-sided lighting may further include a heat sink located on a lower portion of the circuit board.

In this case, the LED lens may include a step portion formed to accommodate the heat sink therein.

The LED lens may be formed of optical glass or optical plastic.

According to an aspect of the present disclosure, an LED double-sided lighting apparatus may include: a case; a plurality of LED modules installed inside the case and including a circuit board having an LED mounted thereon and an LED lens, the LED lens including a light receiving portion formed on an upper portion of the circuit board and receiving light from the LED, a first light transmitting portion corresponding to the light receiving portion and transmitting a portion of the light in an upward direction therefrom, a reflective portion extended from the first light transmitting portion and reflecting a portion of the light, and a second light transmitting portion facing the first light transmitting portion and transmitting the light reflected by the reflective portion in a downward direction therefrom, and containing a light diffusion agent dispersed therein; and diffusion plates provided in upper and lower parts of the LED modules.

The diffusion plates may be formed of acryl.

Advantageous Effects

In an LED lens and an LED module for double-sided lighting and an LED double-sided lighting apparatus using the same according to an embodiment of the present disclosure, an LED lens for double-sided lighting may be manufactured to include a first light transmitting portion corresponding to the light receiving portion, receiving light incident from an LED and transmitting a portion of light in an upward direction therefrom, a reflective portion reflecting a portion of light, and a second light transmitting portion allowing the light reflected by the reflective portion to be transmitted in a downward direction therefrom. Accordingly, light from LEDs emitted in two directions therefrom may be implemented to allow for the use of a relatively reduced amount of LEDs, such that product manufacturing costs and manufacturing periods may be reduced.

In addition, since LED lenses for double-sided lighting are able to be modularized, product assembly properties and productivity may be improved.

DESCRIPTION OF DRAWINGS

The above and other aspects, features and other advantages will be more clearly understood from the following detailed description taken in conjunction with the accompanying drawings, in which.

BEST MODE FOR INVENTION

Figure 1:
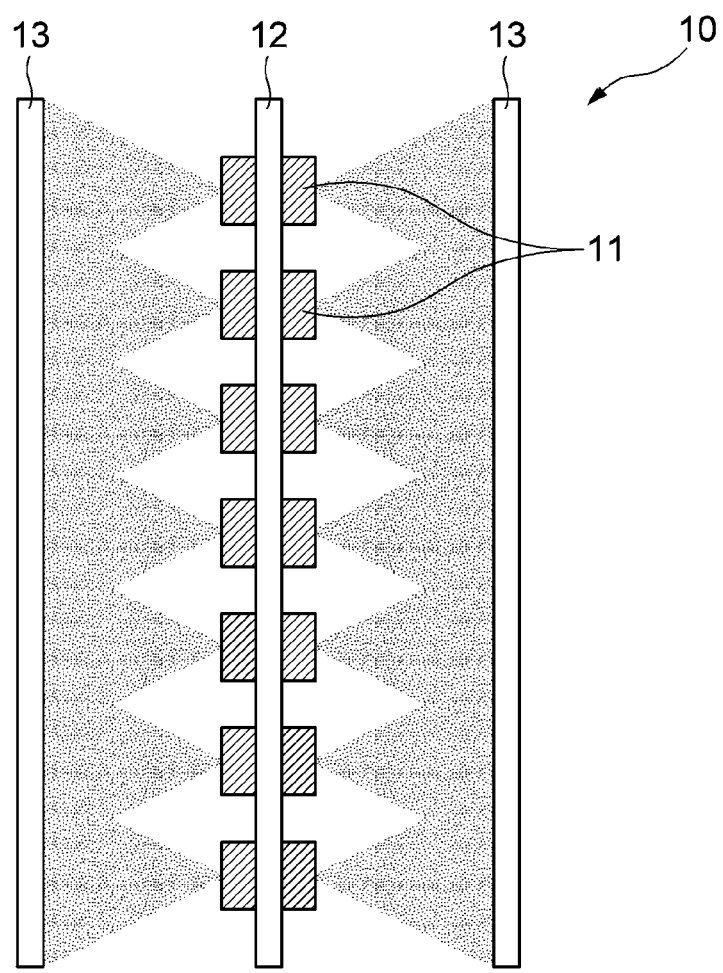
FIG. 1 is a cross-sectional view of a double-sided illuminated sign using a general LED.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 2:
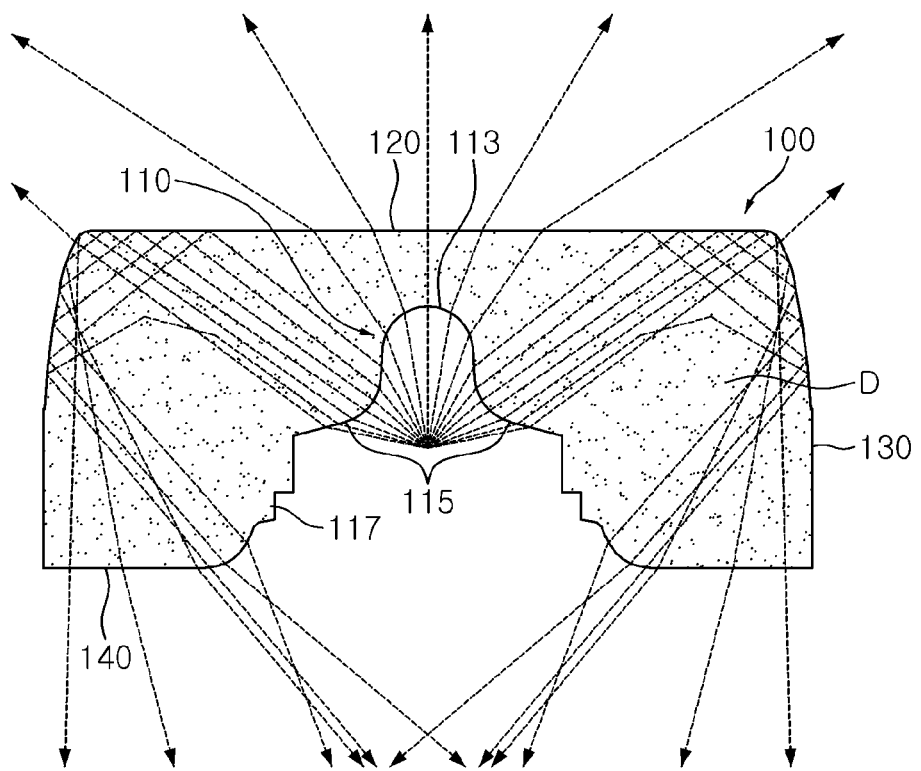
FIG. 2 is a cross-sectional view schematically illustrating an LED lens for double-sided lighting according to an embodiment of the present disclosure.

FIG. 2 is a cross-sectional view schematically illustrating an LED lens for double-sided lighting according to an embodiment of the present disclosure. As illustrated in FIG. 2, an LED lens 100 for double-sided lighting according to an embodiment of the present disclosure may include a light receiving portion 110, a first light transmitting portion 120, a reflective portion 130, and a second light transmitting portion 140. The light receiving portion 110 may be formed of an apical surface 113 serving as an incident surface onto which light emitted from a light source (not shown) is initially incident and formed in a concave manner in a direction in which the light is output, and inclined surfaces 115 extended from both sides of the apical surface 113 to be concavely curved. A step portion 117 may be further formed to extend from the inclined surface 115.

The first light transmitting portion 120 may be above the light receiving portion 110 so as to correspond thereto in an upper part of the light receiving portion 110. A portion of incident light from the light receiving portion 110 may be refracted on the apical surface 113 to be transmitted in an upward direction therefrom, and remaining light may be refracted on the inclined surfaces 115 to be reflected by the reflective portion 130. The reflective portion 130 may be extended to aside of the first light transmitting portion 120, and may allow light reflected by the first light transmitting portion 120 to be refracted and reflected toward the second light transmitting portion 140. The second light transmitting portion 140 may be located on a lower surface of the lens to oppose the first light transmitting portion 120, and may allow light reflected by the reflective portion 130 to be refracted and transmitted in a downward direction therefrom.

Therefore, in the LED lens 100 for double-sided lighting, having the shape as described above, light may be reflected or refracted inside the LED lens 100 for double-sided lighting so as to be transmitted in upward and downward directions of the LED lens 100 for double-sided lighting therefrom, such that light emission from the LED in two directions may be implemented. In addition, a light diffusion agent D may be diffused inside the LED lens 100 for double-sided lighting, and the light diffusion agent D may change a path of a portion of light while allowing for uniform brightness in the distribution of light transmitted in upward and downward directions, such that an amount of light toward a lower part thereof may be increased. In the case of the light diffusion agent D, an oxide such as $TiO_2$, $Al_2O_3$, $SiO_2$, or the like may be used, or a polymer may be used. When a high-molecular polymer is used, positive attributes such as an increase in haze may be present, together with an increase in a degree of light diffusion. The LED lens 100 for double-sided lighting may include 0.1 to 10% of the light diffusion agent D with respect to a volume ratio thereof. On the other hand, the LED lens 100 for double-sided lighting may be formed through an injection molding method, an extrusion molding method, or the like, and may be formed using optical glass having a relatively high refractive index or dispersion index, such as BK7 or SK5, or optical plastic such as polycarbonate, PMMA (acryl) or the like having relatively high transparency and internal uniformity.

Figure 3:
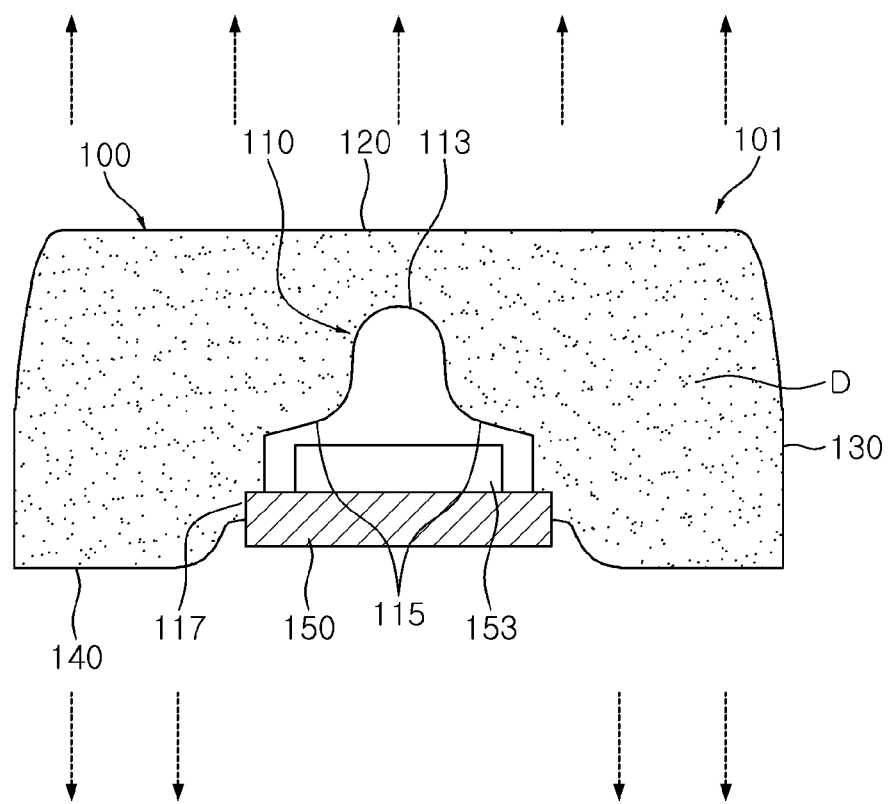
FIG. 3 is a cross-sectional view schematically illustrating an LED module for double-sided lighting according to another embodiment of the present disclosure.

FIG. 3 is a cross-sectional view schematically illustrating an LED module for double-sided lighting according to another embodiment of the present disclosure.

As shown in FIG. 3, an LED module 101 for double-sided lighting according to the present embodiment may be an LED module for double-sided lighting including the LED lens 100 for double-sided lighting having the configuration as illustrated in FIG. 2. Here, in FIG. 3, configurations having the same functions as those of the configurations of FIG. 2 refer to the same reference numerals, and overlapped descriptions thereof will be omitted below.

The LED module 101 may include a circuit board 150 having an LED 153 mounted thereon and the LED lens 100 for double-sided lighting configured as illustrated in FIG. 2.

The circuit board 150 having the LED 153 mounted thereon may include a driving IC controlling a current supplied to the LED 153 or a connector for connection thereof with external power, an element for protecting the LED 153, and the like, and may be formed of an FR-4, a metal or the like.

The LED lens 100 for double-sided lighting may be mounted on an upper part of the circuit board 150 having the LED 153 mounted thereon.

In this case, the circuit board 150 having the LED 153 mounted thereon may be inserted into a step portion 117 extended from the inclined surface 115.

In the LED module 101 for double-sided lighting, formed as described above, light incident from the LED 153 may be refracted on the light receiving portion 110 and may then be incident onto the first light transmitting portion 120.

In the light incident from the light receiving portion 110 to the first light transmitting portion 120, when light is transmitted at an emission angle less than a critical angle, the light may be refracted on the apical surface 113 to be transmitted in an upward direction therefrom, and when the light is transmitted at an emission angle greater than the critical angle, the light may be refracted on the inclined surface 115 of the light receiving portion 110 to be reflected by the first light transmitting portion 120 and then re-reflected by the reflective portion 130.

In the light reflected by the reflective portion 130, when the light is transmitted at an emission angle less than a critical angle, the light may be transmitted from the reflective portion 130 to a lower part thereof, and when the light is transmitted at an emission angle greater than the critical angle, the light may be reflected by the reflective portion 130 to be transmitted through the second light transmitting portion 140. In addition, the light diffusion agent D may be diffused inside the LED lens 100 for double-sided lighting, and the light diffusion agent D allows for uniform brightness in the distribution of light transmitted in upward and downward directions, and may change a path of a portion of light such that an amount of light toward a lower part thereof may be increased.

Figure 4:
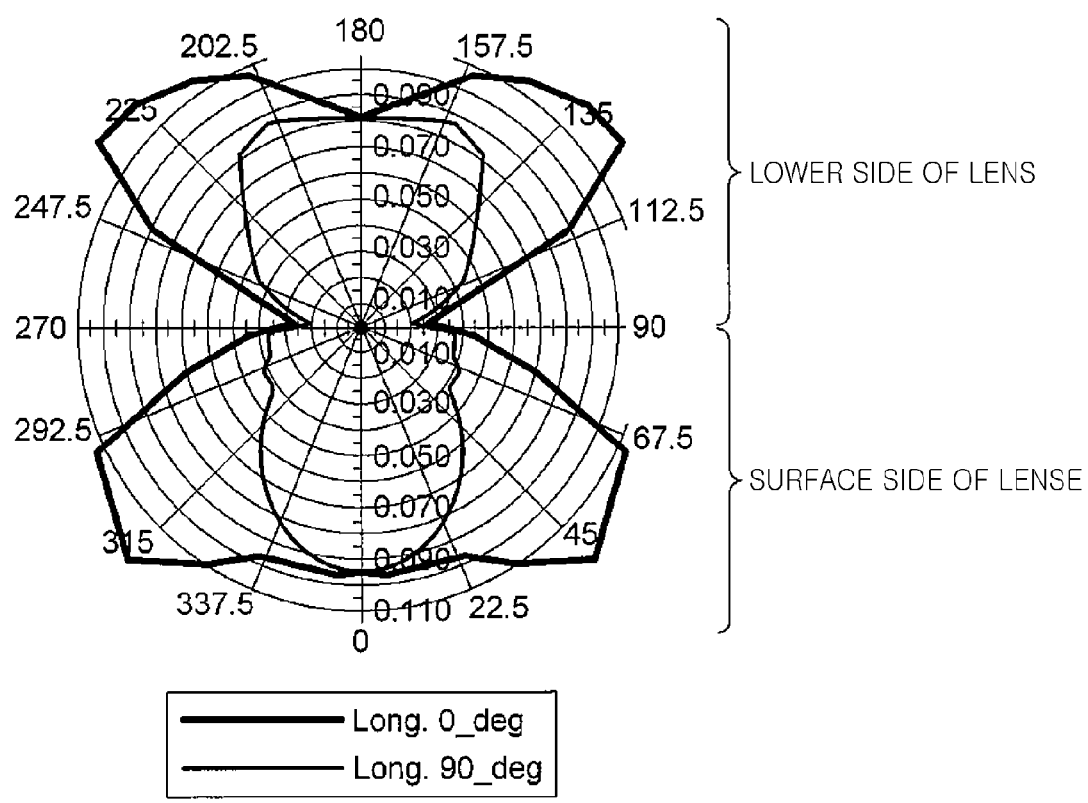
FIG. 4 is a graph illustrating a light distribution simulation result of an LED module for double-sided lighting according to an embodiment of the present disclosure.

Thus, it can be appreciated that as the LED module 101 for double-sided lighting includes the LED lens 100 for double-sided lighting as illustrated in FIG. 2, the amount of light irradiated onto an upper portion of the LED lens 100 for double-sided lighting may be within a range of around 20 to 80% of the amount of light of the LED 153, and the amount of light irradiated onto a lower portion of the LED lens 100 for double-sided lighting may be within a range of around 20 to 80% of the amount of light of the LED 153. In detail, as illustrated in FIG. 4, as an angle of light irradiated onto an upper portion of the LED lens 100 is significantly similar to that of light irradiated onto a lower portion thereof, significantly similar amounts of light incident from the LED 153 may be transmitted to an upper portion and a lower portion of the LED lens 100 for double-sided lighting.

Figure 5:
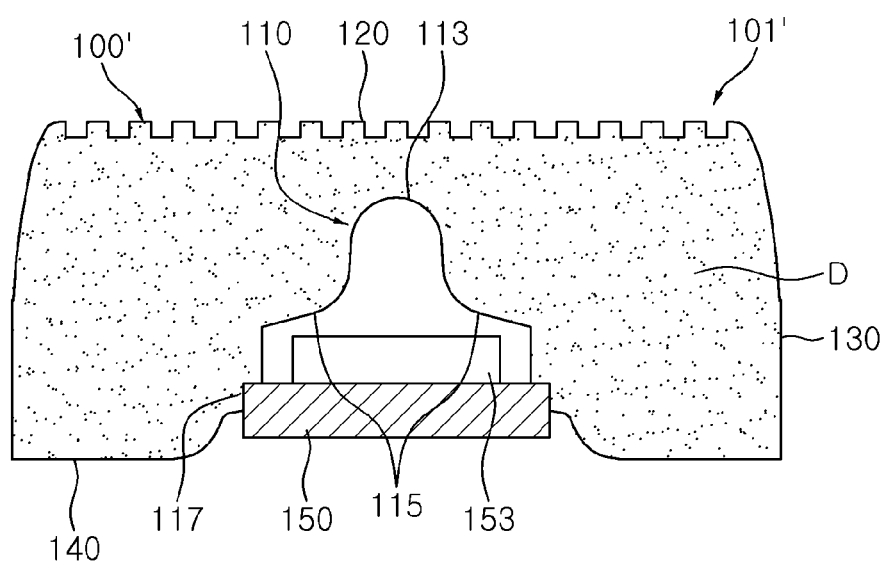
FIGS. 5 and 6 are cross-sectional views schematically illustrating an LED module for double-sided lighting according to a modified embodiment of the present disclosure.
Figure 6:
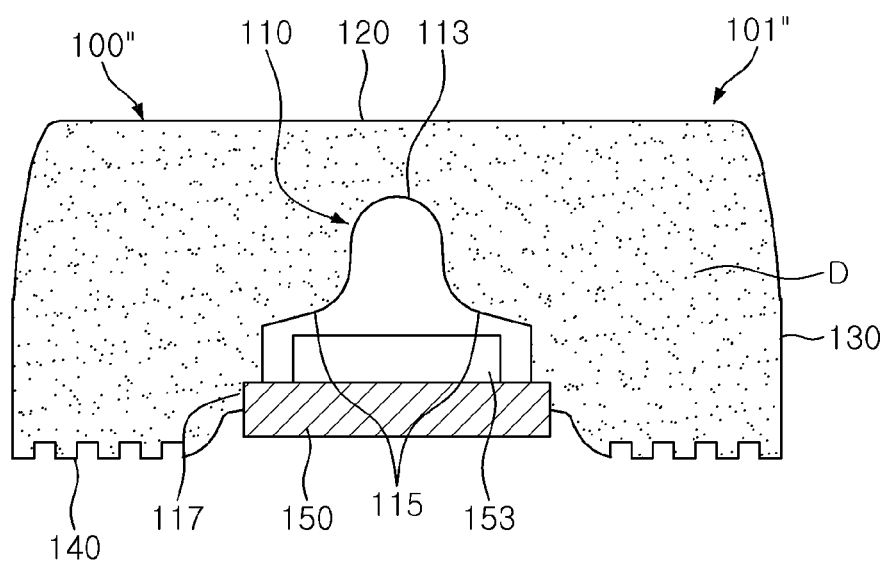

FIGS. 5 and 6 are cross-sectional views schematically illustrating an LED module for double-sided lighting according to a modified embodiment of the present disclosure. In the case of an embodiment illustrated in FIG. 5, the configuration of an LED module 101' for double-sided lighting is significantly similar to that of the foregoing embodiment, except for an uneven structure formed in a first light transmitting portion 120. In addition, in the case of an embodiment of FIG. 6, an LED module 101" for double-sided lighting may include an uneven structure formed in the second light transmitting portion 140. As such, by forming the uneven structures in the first and second light transmitting portions 120 and 140, the amount of externally output light and uniformity thereof may be improved. In this case, although not particularly illustrated in the drawings, a structure in which the embodiments of FIGS. 5 and 6 are both used may be applied thereto, for example, the uneven structure may also be formed in both of the first and second light transmitting portions 120 and 140.

Figure 7:
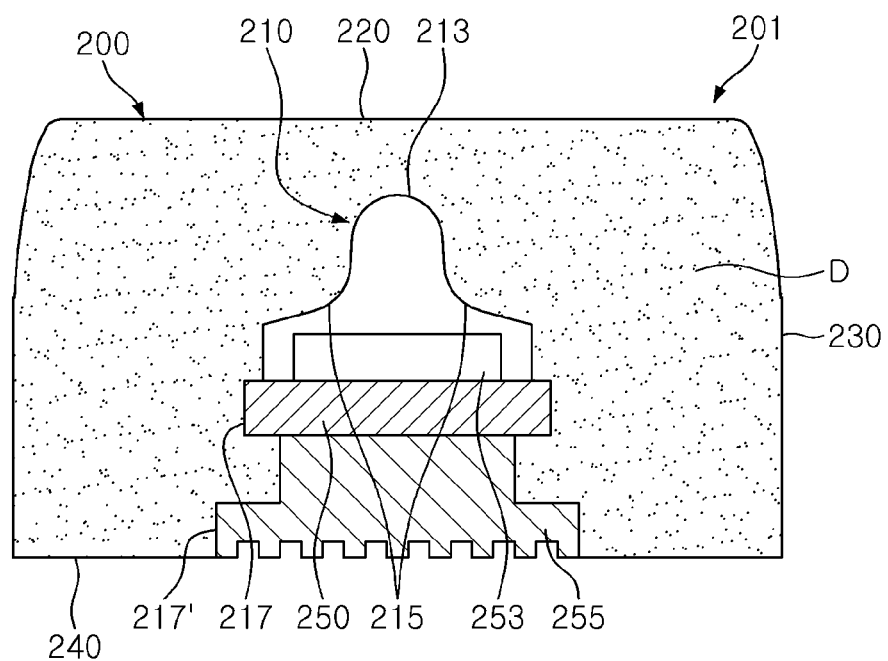
FIG. 7 is a cross-sectional view schematically illustrating an LED module for double-sided lighting according to another embodiment of the present disclosure.

FIG. 7 is a cross-sectional view schematically illustrating an LED module for double-sided lighting according to another embodiment of the present disclosure.

As illustrated in FIG. 7, an LED module 201 for double-sided lighting according to the embodiment may have a structure significantly similar to that of the foregoing embodiment, and may be configured of a circuit board 250 having an LED 253 mounted thereon and an LED lens 200 for double-sided lighting.

The circuit board 250 having the LED 253 mounted thereon may include a driving IC controlling a current supplied to the LED 253 or a connector for connection thereof with external power, an element for protecting the LED 253, and the like, and may be formed of an FR-4, a metal or the like. In the case of the present embodiment, a heat sink 255 discharging heat generated in the LED 253 and the circuit board 250 to the outside thereof may be formed on a lower portion of the circuit board 250. Further, the LED lens 200 for double-sided lighting may be mounted on upper portions of the circuit board 250 having the LED 253 mounted thereon and the heat sink 255.

The LED lens 200 for double-sided lighting may include a light receiving portion 210, a first light transmitting portion 220, a reflective portion 230, and a second light transmitting portion 240. In addition, the LED lens 200 for double-sided lighting may include an apical surface 213 formed in a concave manner in a direction in which the light is output, and inclined surfaces 215 extended from both sides of the apical surface 213 to be concavely curved. A first step portion 217 may be extended from the inclined surface 215. In the case of the present embodiment, a second step portion 217' may be further formed to have a shape corresponding to that of the heat sink 255, for accommodation thereof, therein. In addition, a light diffusion agent D may be dispersed inside the LED lens 200 for double-sided lighting, and may change a path of a portion of light such that an amount of light directed toward a lower part thereof may be increased while allowing for brightness distribution of light transmitted in upward and downward directions therefrom to be uniform.

Figure 8:
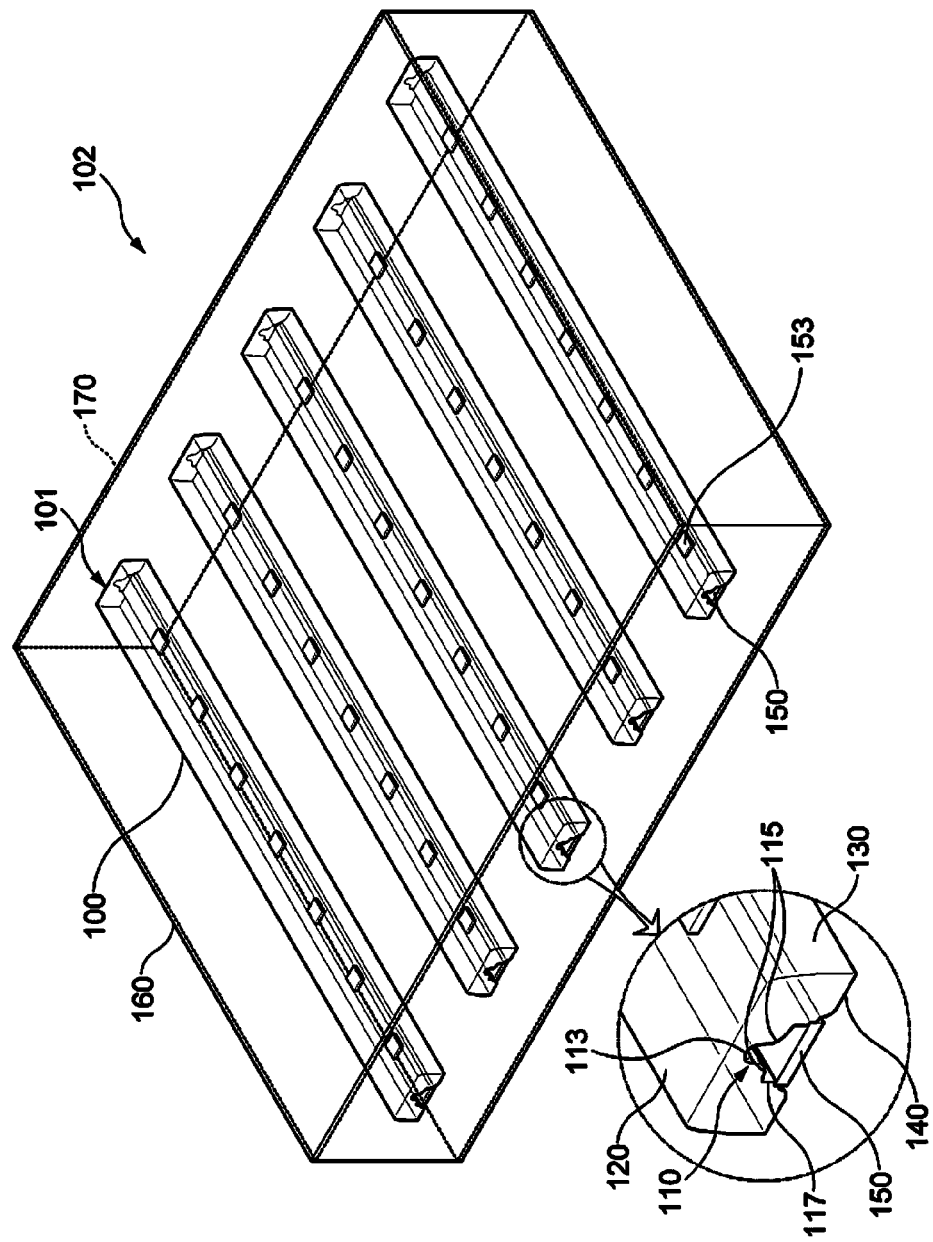
FIG. 8 is a perspective view schematically illustrating an LED double-sided lighting apparatus according to an embodiment of the present disclosure.

FIG. 8 is a perspective view schematically illustrating an LED double-sided lighting apparatus according to an embodiment of the present disclosure.

As illustrated in FIG. 8, an LED double-sided lighting apparatus 102 according to the embodiment may include a plurality of the LED modules 101 for double-sided lighting, having the configuration as described above and illustrated in FIG. 3, a case 160, and a diffusion plate 170. Here, in FIG. 8, configurations having the same functions as those of the configurations illustrated in FIG. 3 refer to the same reference numerals, and overlapped descriptions thereof will be omitted below.

The case 160 may protect the LED modules 101 for double-sided lighting from external environments and may be formed of a material such as aluminum or the like.

In an inside of the case 160, the plurality of LED modules 101 for double-sided lighting may be spaced apart from each other at equidistant intervals therebetween, and the LED modules 101 for double-sided lighting may be provided with the diffusion plates 170 provided in upper and lower parts thereof and formed of acryl or the like.

The LED double-sided lighting apparatus 102 formed as above may include the LED modules 101 for double-sided lighting as illustrated in FIG. 3, and thus, the LEDs formed on both sides of a circuit board according to the related art may not be required according to an embodiment of the present disclosure.

For example, when the size of the case 160 of the LED double-sided lighting apparatus 102 is 600 mm×1000 mm, a distance between the LED modules 101 for double-sided lighting is 50 mm, and a distance between the diffusion plates 170 provided in upper and lower parts of the LED modules 101 for double-sided lighting is 65 mm, while around 750 LEDs are used in the case of the related art, in the present disclosure, around 340 LEDs 153 may be used by using the LED lens 100 for double-sided lighting according to an embodiment of the present disclosure, such that the amount of LEDs 153 may be reduced to ½ as compared to the case of the related art.

As such, in the cases of the LED lens 100 for double-sided lighting, the LED modules 101 for double-sided lighting, and the LED double-sided lighting apparatus 102 using the same according to embodiments of the present disclosure, the LED lens 100 for double-sided lighting may be manufactured to include the first light transmitting portion 120 facing the light receiving portion 110 so as to correspond thereto, receiving light incident from the LED 153 and transmitting a portion of the light in an upward direction therefrom; the reflective portion 130 reflecting a portion of the light; and the second light transmitting portion 140 allowing the light reflected by the reflective portion 130 to be transmitted in a downward direction therefrom. Accordingly, light emissions from LEDs 153 in two directions may be implemented using a relatively reduced amount of LEDs 153 such that manufacturing costs and manufacturing periods of time may be lessened.

While exemplary embodiments have been illustrated and described above, it will be apparent to those skilled in the art that modifications and variations could be made without departing from the spirit and scope of the present disclosure as defined by the appended claims.

The invention claimed is:

1. An LED module for double-sided lighting comprising:
    a circuit board having an LED mounted thereon;
    a heat sink located on a lower portion of the circuit board; and
    an LED lens mounted on the circuit board and including a light receiving portion receiving light from the LED, a first light transmitting portion corresponding to the light receiving portion and transmitting a portion of the light in an upward direction therefrom, a reflective portion extended from the first light transmitting portion and reflecting a portion of the light, and a second light transmitting portion facing the first light transmitting portion and transmitting the light reflected by the reflective portion in a downward direction therefrom, the LED lens including a light diffusion agent dispersed therein,
    wherein the heat sink is entirely disposed inside the LED lens with side surfaces contacting inner surfaces of the LED lens, a bottom surface of the heat sink being exposed from the second light transmitting portion.

2. The LED module for double-sided lighting of claim 1, wherein the light receiving portion of the LED lens is formed to include an apical surface formed in a concave manner in a direction in which the light is output, and inclined surfaces extended from both sides of the apical surface to be concavely curved, and the circuit board is accommodated in a step portion extended from the inclined surface.

3. The LED module for double-sided lighting of claim 1, wherein the LED lens includes a step portion formed to accommodate the heat sink therein.

4. The LED module for double-sided lighting of claim 1, wherein the LED lens is formed of optical glass or optical plastic.

5. An LED double-sided lighting apparatus comprising:
    a case;
    a plurality of LED modules installed inside the case and including a circuit board having an LED mounted thereon; a heat sink located on a lower portion of the circuit board; and an LED lens, the LED lens including a light receiving portion receiving light from the LED, a first light transmitting portion corresponding to the light receiving portion and transmitting a portion of the light in an upward direction therefrom, a reflective portion extended from the first light transmitting portion and reflecting a portion of the light, and a second light transmitting portion facing the first light transmitting portion and transmitting the light reflected by the reflective portion in a downward direction therefrom, and containing a light diffusion agent dispersed therein, wherein the heat sink is entirely disposed inside the LED lens with side surfaces contacting inner surfaces of the LED lens, a bottom surface of the heat sink being exposed from the second light transmitting portion; and
    diffusion plates provided in upper and lower parts of the LED modules.

6. The LED double-sided lighting apparatus of claim 5, wherein the diffusion plates are formed of acryl.

* * * * *